(12) United States Patent
Daniell

(10) Patent No.: US 8,176,130 B2
(45) Date of Patent: May 8, 2012

(54) PROCESSING RULES FOR DIGITAL MESSAGES

(75) Inventor: William Todd Daniell, Marietta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 0 days.

(21) Appl. No.: 12/051,633

(22) Filed: Mar. 19, 2008

(65) Prior Publication Data
US 2008/0168149 A1    Jul. 10, 2008

Related U.S. Application Data

(62) Division of application No. 10/686,433, filed on Oct. 14, 2003.

(51) Int. Cl.
G06F 15/16 (2006.01)
(52) U.S. Cl. .......................... 709/206; 709/207
(58) Field of Classification Search .................. 709/206, 709/207
See application file for complete search history.

(56) References Cited

U.S. PATENT DOCUMENTS

| | | | |
|---|---|---|---|
| 5,734,901 A | 3/1998 | Sidhu et al. | |
| 5,917,489 A | 6/1999 | Thurlow et al. | |
| 5,966,714 A | 10/1999 | Huang et al. | |
| 6,020,884 A | 2/2000 | MacNaughton et al. | |
| 6,052,121 A | 4/2000 | Webster et al. | |
| 6,057,841 A * | 5/2000 | Thurlow et al. | 715/809 |
| 6,151,643 A | 11/2000 | Cheng | |
| 6,185,568 B1 | 2/2001 | Douceur et al. | |
| 6,192,410 B1 | 2/2001 | Miller et al. | |
| 6,212,548 B1 | 4/2001 | DeSimone et al. | |
| 6,269,369 B1 | 7/2001 | Robertson | |
| 6,301,609 B1 | 10/2001 | Aravamudan et al. | |
| 6,377,944 B1 | 4/2002 | Busey et al. | |
| 6,405,243 B1 | 6/2002 | Nielsen | |
| 6,430,602 B1 | 8/2002 | Kay et al. | |
| 6,430,604 B1 | 8/2002 | Ogle et al. | |
| 6,453,327 B1 * | 9/2002 | Nielsen | 715/205 |
| 6,463,078 B1 | 10/2002 | Engstrom et al. | |
| 6,480,860 B1 * | 11/2002 | Monday | 1/1 |
| 6,484,196 B1 | 11/2002 | Maurille | |
| 6,539,421 B1 | 3/2003 | Appelman et al. | |

(Continued)

OTHER PUBLICATIONS

Daniell; Advisory Action mailed Jun. 2, 2009 for U.S. Appl. No. 10/686,433, filed Oct. 14, 2003.

(Continued)

Primary Examiner — Yves Dalencourt
Assistant Examiner — Michael C Lai
(74) Attorney, Agent, or Firm — Thomas, Kayden, Horstemeyer & Risley, LLP

(57) ABSTRACT

Systems and methods for handling email messages are described. Some embodiments are directed to determining whether an email message meets a predefined condition, and executing an action in an instant messaging (IM) system in response to determining that the email message meets the predefined condition. Other embodiments are directed to providing a programming interface, and storing inputs provided by a user at the programming interface. For those embodiments, the programming interface is adapted to receive user input in the form of a markup language. The inputs include a condition and an action. Yet other embodiments are directed to determining whether a digital message meets a predefined condition, and executing a filtering algorithm on the digital message in response to determining that the digital message does not meet the predefined condition. The digital message may be, for example, an email message or an IM message.

12 Claims, 6 Drawing Sheets

U.S. PATENT DOCUMENTS

| | | | |
|---|---|---|---|
| 6,549,937 B1 | 4/2003 | Auerbach et al. | |
| 6,669,564 B1 | 12/2003 | Young et al. | |
| 6,675,356 B1 | 1/2004 | Adler et al. | |
| 6,684,248 B1 | 1/2004 | Janacek et al. | |
| 6,697,474 B1 | 2/2004 | Hanson et al. | |
| 6,781,608 B1 | 8/2004 | Crawford | |
| 6,839,737 B1* | 1/2005 | Friskel | 709/206 |
| 6,847,969 B1 | 1/2005 | Mathai et al. | |
| 6,865,268 B1 | 3/2005 | Matthews et al. | |
| 6,879,994 B1 | 4/2005 | Matsliach | |
| 6,910,081 B1 | 6/2005 | Hammond | |
| 6,912,564 B1* | 6/2005 | Appelman et al. | 709/204 |
| 6,941,149 B2 | 9/2005 | Smith et al. | |
| 6,941,345 B1 | 9/2005 | Kapil et al. | |
| 6,978,136 B2 | 12/2005 | Jenniges | |
| 6,981,223 B2* | 12/2005 | Becker et al. | 715/753 |
| 7,000,194 B1 | 2/2006 | Newbold | |
| 7,007,068 B2 | 2/2006 | Morkel | |
| 7,188,127 B2* | 3/2007 | Stakutis et al. | 1/1 |
| 7,197,537 B2 | 3/2007 | Koch | |
| 7,206,814 B2* | 4/2007 | Kirsch | 709/206 |
| 7,222,156 B2 | 5/2007 | Gupta et al. | |
| 7,290,033 B1 | 10/2007 | Goldman | |
| 7,317,928 B2 | 1/2008 | Stewart et al. | |
| 7,525,951 B2* | 4/2009 | Musil et al. | 370/352 |
| 2002/0032573 A1 | 3/2002 | Williams | |
| 2002/0046250 A1 | 4/2002 | Nassiri | |
| 2002/0049751 A1 | 4/2002 | Chen | |
| 2002/0049961 A1* | 4/2002 | Fang et al. | 717/127 |
| 2002/0061003 A1 | 5/2002 | Sumner | |
| 2002/0065887 A1 | 5/2002 | Paik et al. | |
| 2002/0065894 A1 | 5/2002 | Dalal | |
| 2002/0120716 A1 | 8/2002 | Raghunathan et al. | |
| 2002/0198946 A1 | 12/2002 | Wang et al. | |
| 2003/0013483 A1 | 1/2003 | Ausems et al. | |
| 2003/0023691 A1 | 1/2003 | Knauerhase | |
| 2003/0030670 A1 | 2/2003 | Duarte et al. | |
| 2003/0065926 A1* | 4/2003 | Schultz et al. | 713/188 |
| 2003/0110227 A1 | 6/2003 | O'Hagan | |
| 2003/0210265 A1 | 11/2003 | Haimberg | |
| 2003/0217096 A1 | 11/2003 | McKelvie et al. | |
| 2003/0217108 A1 | 11/2003 | Karim | |
| 2003/0229670 A1 | 12/2003 | Beyda | |
| 2003/0229673 A1 | 12/2003 | Malik | |
| 2004/0054737 A1 | 3/2004 | Daniell | |
| 2004/0078445 A1 | 4/2004 | Malik | |
| 2004/0128356 A1 | 7/2004 | Bernstein et al. | |
| 2004/0193722 A1 | 9/2004 | Donovan | |
| 2004/0254998 A1 | 12/2004 | Horvitz | |
| 2004/0267887 A1 | 12/2004 | Berger et al. | |
| 2005/0030937 A1 | 2/2005 | Wick et al. | |
| 2005/0080852 A1 | 4/2005 | Kelley et al. | |
| 2005/0080864 A1 | 4/2005 | Daniell | |
| 2005/0091319 A1 | 4/2005 | Kirsch | |
| 2005/0091329 A1 | 4/2005 | Friskel | |
| 2005/0108225 A1* | 5/2005 | Chau | 707/3 |
| 2005/0223069 A1 | 10/2005 | Cooperman et al. | |
| 2005/0262220 A1* | 11/2005 | Ecklund et al. | 709/219 |
| 2006/0036683 A1 | 2/2006 | Bracewell et al. | |
| 2006/0077462 A1* | 4/2006 | Saito | 358/1.15 |
| 2006/0080393 A1 | 4/2006 | Cardone et al. | |
| 2007/0016647 A1 | 1/2007 | Gupta et al. | |
| 2007/0260580 A1 | 11/2007 | Omoigui | |

OTHER PUBLICATIONS

Daniell; Final Rejection mailed Dec. 1, 2008 for U.S. Appl. No. 11/405,259, filed Apr. 17, 2006.
Daniell; Final Office Action mailed Feb. 18, 2009 for U.S. Appl. No. 10/686,433, filed Oct. 14, 2003.
Daniell; Non- Final Rejection mailed Jan. 25, 2008; for U.S. Appl. No. 10/326,479, filed Dec. 19, 2002.
Daniell; Non-Final Rejection mailed Apr. 24, 2006; for U.S. Appl. No. 10/325,317, filed Dec. 19, 2002.
Daniell; Final Rejection mailed Oct. 6, 2006; for U.S. Appl. No. 10/325,317, filed Dec. 19, 2002.
Daniell; Examiner Interview Summary Record mailed Jan. 8, 2007; for U.S. Appl. No. 10/325,317, filed Dec. 19, 2002.
Daniell; Non- Final Rejection mailed Mar. 21, 2007; for U.S. Appl. No. 10/325,317, filed Dec. 19, 2002.
Daniell; Final Rejection mailed Sep. 7, 2007; for U.S. Appl. No. 10/325,317, filed Dec. 19, 2002.
Daniell; Non- Final Rejection mailed Jan. 25, 2008; for U.S. Appl. No. 10/325,317, filed Dec. 19, 2002.
Daniell; Non- Final Rejection mailed Apr. 21, 2006; for U.S. Appl. No. 10/325,268, filed Dec. 19, 2002.
Daniell; Final Rejection mailed Oct. 25, 2006; for U.S. Appl. No. 10/325,268, filed Dec. 19, 2002.
Daniell; Examiner Interview Summary Record mailed Jan. 8, 2007; for U.S. Appl. No. 10/325,268, filed Dec. 19, 2002.
Daniell; Advisory Action mailed Feb. 14, 2007; for U.S. Appl. No. 10/325,268, filed Dec. 19, 2002.
Daniell; Non- Final Rejection mailed May 3, 2004; for U.S. Appl. No. 10/325,044, filed Dec. 19, 2002.
Daniell; Final Rejection mailed Nov. 30, 2004; for U.S. Appl. No. 10/325,044, filed Dec. 19, 2002.
Daniell; Examiner Interview Summary Record mailed Jan. 6, 2005; for U.S. Appl. No. 10/325,044, filed Dec. 19, 2002.
Daniell; Non- Final Rejection mailed Feb. 24, 2005; for U.S. Appl. No. 10/325,044, filed Dec. 19, 2002.
Daniell; Final Rejection mailed Aug. 25, 2005; for U.S. Appl. No. 10/325,044, filed Dec. 19, 2002.
Daniell; Non- Final Rejection mailed Dec. 30, 2005; for U.S. Appl. No. 10/325,044, filed Dec. 19, 2002.
Daniell; Examiner Interview Summary Record mailed Jul. 5, 2006; for U.S. Appl. No. 101325,044, filed Dec. 19, 2002.
Daniell; Final Rejection mailed Jul. 5, 2006; for U.S. Appl. No. 10/325,044, filed Dec. 19, 2002.
Daniell; Examiner Interview Summary Record mailed Aug. 29, 2006; for U.S. Appl. No. 10/325,044, filed Dec. 19, 2002.
Daniell; Non- Final Rejection mailed Oct. 23, 2006; for U.S. Appl. No. 10/325,044, filed Dec. 19, 2002.
Daniell; Final Rejection mailed Mar. 28, 2007; for U.S. Appl. No. 10/325,044, filed Dec. 19, 2002.
Daniell; Examiner Interview Summary Record mailed Jun. 20, 2007; for U.S. Appl. No. 10/325,044, filed Dec. 19, 2002.
Daniell; Non- Final Rejection mailed Sep. 4, 2007; for U.S. Appl. No. 10/325,044, filed Dec. 19, 2002.
Daniell; Examiner Interview Summary Record mailed Oct. 29, 2007; for U.S. Appl. No. 10/325,044, filed Dec. 19, 2002.
Daniell; Non- Final Rejection mailed Feb. 5, 2008; for U.S. Appl. No. 10/325,044, filed Dec. 19, 2002.
Malik; Non-Final Rejection mailed Sep. 24, 2007; U.S. Appl. No. 10/686,431, filed Oct. 14, 2003.
Daniell; Non-Final Rejection mailed Jun. 15, 2007; U.S. Appl. No. 11/405,259, filed Apr. 17, 2006.
Daniell; Examiner Interview Summary Record mailed Sep. 7, 2007; U.S. Appl. No. 11/405,259, filed Apr. 17, 2006.
Daniell; Final Rejection mailed Nov. 16, 2007; U.S. Appl. No. 11/405,259, filed Apr. 17, 2006.
International Search Report mailed Mar. 3, 2004, for PCT/US03/35759.
International Search Report mailed May 11, 2004, for PCT/US03/29066.
International Search Report mailed May 5, 2004, for PCT/US03/29226.
Oikarinen; "Internet Relay Chat Protocol", May 1993, pp. 1-65.
Andre; draft-ietf-xmpp-im-12:, dated Jun. 4, 2003, pp. 1-88.
Start up Program, www.malvino.com, Nov. 22, 1998, pp. 1-6.
Trillian; Communicate with Flexibility and Style, www.ceruleanstudios.com, Sep. 10, 2002, pp. 1-15.
Jabber; "Open Instant Messaging Powered by XMPP",www.jabber.org, Apr. 23, 2003, pp. 1-3.
Ramsel; "Simple Instant Messaging and Presence 1.3 Protocol", Mitre Corporation, Jun. 2001, pp. 1-19.
Day; "A Model for Presence and Instant Messaging", Feb. 2000, pp. 1-17.
Paik; "Impp, simple, prim, iptel (CPL), sigtran(SCTP)", Apr. 22, 2002, pp. 1-248.
Angerstein (WG); "Extensible Markup Language (XML) 1.0", W3C Recommendation, Second Edition, Oct. 6, 2000, pp. 1-59.

Osborne; "RVP: A Presence and Instant Messaging Protocol", Dec. 2000, pp. 1-37.
Rosenberg; "SIP Even Packages for Call Leg and Conference State", Mar. 1, 2002, pp. 1-23.
Trillian; Features, Tour, messaging Enhancements, Connect to 5 Mediums, Interface Overview, Features Tour, Gallery-Contact List, Sending Pictures, Message Windows, Apr. 23, 2003, pp. 1-9.
Rosenberg; "A Component Model for SIMPLE", Feb. 22, 2002, pp. 1-11.
Day; "Instant Messaging/ Presence Protocol Requirements", Feb. 2000, pp. 1-26.
Daniell; U.S. Appl. No. 10/686,433, filed Oct. 14, 2003.
Daniell; U.S. Appl. No. 10/814,202, filed Mar. 31, 2004.
Daniell; U.S. Appl. No. 10/326,479, filed Dec. 19, 2002.
Daniell; U.S. Appl. No. 10/325,317, filed Dec. 19, 2002.
Daniell; U.S. Appl. No. 10/325,268, filed Dec. 19, 2002.
Daniell; U.S. Appl. No. 10/325,044, filed Dec. 19, 2002.
Malik; U.S. Appl. No. 10/686,431, filed Oct. 14, 2003.
Malik; U.S. Appl. No. 10/686,345, filed Oct. 14, 2003.
Daniell; U.S. Appl. No. 11/405,259 filed Apr. 17, 2006.
Daniell; Non- Final Rejection mailed May 7, 2007; for U.S. Appl. No. 10/686,433, filed Oct. 14, 2003.
Daniell; Examiner Interview Summary Record mailed Jul. 23, 2007; for U.S. Appl. No. 10/686,433, filed Oct. 14, 2003.
Daniell; Final Rejection mailed Feb. 20, 2008; for U.S. Appl. No. 10/686,433, filed Oct. 14, 2003.
Daniell; Non- Final Rejection mailed Dec. 21, 2004; for U.S. Appl. No. 10/814,202, filed Mar. 31, 2004.
Daniell; Examiner Interview Summary Record mailed Feb. 25, 2005; for U.S. Appl. No. 10/814,202, filed Mar. 31, 2004.
Daniell; Final Rejection mailed Jun. 16, 2005; for U.S. Appl. No. 10/814,202, filed Mar. 31, 2004.
Daniell; Non-Final Rejection mailed Dec. 1, 2005; for U.S. Appl. No. 10/814,202, filed Mar. 31, 2004.
Daniell; Examiner Interview Summary Record mailed Dec. 1, 2005; for U.S. Appl. No. 10/814,202, filed Mar. 31, 2004.
Daniell; Final Rejection mailed May 10, 2006; for U.S. Appl. No. 10/814,202, filed Mar. 31, 2004.
Daniell; Examiner Interview Summary Record mailed Jul. 14, 2006; for U.S. Appl. No. 10/814,202, filed Mar. 31, 2004.
Daniell; Advisory Action mailed Jul. 20, 2006; for U.S. Appl. No. 10/814,202, filed Mar. 31, 2004.
Daniell; Examiner Interview Summary Record mailed Aug. 29, 2006; for U.S. Appl. No. 10/814,202, filed Mar. 31, 2004.
Daniell; Non-Final Rejection mailed Sep. 22, 2006; for U.S. Appl. No. 10/814,202, filed Mar. 31, 2004.
Daniell; Final Rejection mailed Mar. 28, 2007; for U.S. Appl. No. 10/814,202, filed Mar. 31, 2004.
Daniell; Examiner Interview Summary Record mailed Jun. 20, 2007; for U.S. Appl. No. 10/814,202, filed Mar. 31, 2004.
Daniell; Non-Final Rejection mailed Sep. 4, 2007; for U.S. Appl. No. 10/814,202, filed Mar. 31, 2004.
Daniell; Examiner Interview Summary Record mailed Oct. 29, 2007; for U.S. Appl. No. 10/814,202, filed Mar. 31, 2004.
Daniell; Final Rejection mailed Jan. 25, 2008; for U.S. Appl. No. 10/814,202, filed Mar. 31, 2004.
Daniell; Non- Final Rejection mailed Apr. 19, 2006; for U.S. Appl. No. 10/326,479, filed Dec. 19, 2002.
Daniell; Examiner Interview Summary Record mailed Jun. 8, 2006; for U.S. Appl. No. 10/326,479, filed Dec. 19, 2002.
Daniell; Final Rejection mailed Sep. 28, 2006; for U.S. Appl. No. 10/326,479, filed Dec. 19, 2002.
Daniell; Non- Final Rejection mailed Mar. 6, 2007; for U.S. Appl. No. 10/326,479, filed Dec. 19, 2002.
Daniell; Final Rejection mailed Aug. 27, 2007; for U.S. Appl. No. 10/326,479, filed Dec. 19, 2002.
W3C; Extensible Markup Language (XML) 1.0 (Second Edition—W3C Recommendation; Oct. 6, 2000; pp. 1-59.
Daniell; Non-Final Rejection mailed Mar. 20, 2008 for U.S. Appl. No. 10/325,268, filed Dec. 19, 2002.
Daniell; Non-Final Rejection mailed May 28, 2008 for U.S. Appl. No. 11/405,259, filed Apr. 17, 2006.
Daniell; Non-Final Rejection mailed May 28, 2008 for U.S. Appl. No. 11/405,259, filed Apr. 17, 2006.
Daniell; Non-Final Rejection mailed Dec. 8, 2009 for U.S. Appl. No. 10/686,433, filed Oct. 14, 2003.
Daniell; Final Office Action mailed Jun. 9, 2010 for U.S. Appl. No. 10/686,433, filed Oct. 14, 2003.
Daniell; Non-Final Office Action mailed Nov. 5, 2010 for U.S. Appl. No. 10/686,433, filed Oct. 14, 2003.
Daniell; Final Office Action mailed Sep. 17, 2010 for U.S. Appl. No. 11/405,259, filed Apr. 17, 2006.
Daniell; Notice of Allowance mailed Apr. 13, 2011 for U.S. Appl. No. 10/686,433, filed Oct. 14, 2003.

* cited by examiner

PROCESSING RULES FOR DIGITAL MESSAGES

CROSS REFERENCE TO RELATED APPLICATIONS

This application is a divisional of U.S. application Ser. No. 10/686,433, filed Oct. 14, 2003, which is incorporated herein by reference as if set forth in its entirety.

This application also incorporates by reference the following applications, as if they were set forth in their entireties: U.S. patent application having Ser. No. 10/274,405, filed Oct. 18, 2002; U.S. patent application having Ser. No. 10/274,408, filed Oct. 18, 2002; U.S. patent application having Ser. No. 10/274,478, filed Oct. 18, 2002; U.S. patent application having Ser. No. 10/325,268, filed Dec. 19, 2002; U.S. patent application having Ser. No. 10/610,736, filed Jun. 30, 2003; U.S. provisional patent application having Ser. No. 60/411,336, filed Sep. 17, 2002; U.S. provisional patent application having Ser. No. 60/411,438, filed Sep. 17, 2002; U.S. provisional patent application having Ser. No. 60/416,916, filed Oct. 8, 2002; U.S. provisional patent application having Ser. No. 60/419,613, filed Oct. 17, 2002; U.S. provisional patent application having Ser. No. 60/426,145, filed Nov. 14, 2002; U.S. provisional patent application having Ser. No. 60/426,146, filed Nov. 14, 2002; U.S. provisional patent application having Ser. No. 60/426,422, filed Nov. 14, 2002; U.S. provisional patent application having Ser. No. 60/426,432, filed Nov. 14, 2002; and U.S. provisional patent application having Ser. No. 60/426,440, filed Nov. 14, 2002.

Additionally, U.S. application Ser. Nos. 10/685,686, titled "Identifying Undesired Email Messages Having Attachments," filed on Oct. 14, 2003; 10/686,346, titled "Filtered Email Differentiation," filed on Oct. 14, 2003; and 10/685,558, titled "Phonetic Filtering of Undesired Email Messages," filed on Oct. 14, 2003, are also incorporated herein by reference in their entireties.

FIELD OF THE DISCLOSURE

The present disclosure relates generally to electronic communications and, more particularly, to network communications.

BACKGROUND

Email clients have been used extensively as a digital communications medium between two parties. Email clients have incorporated rule-based processing in order to facilitate organization of incoming email messages. One such example of a rule-based processing system and method is provided in U.S. Pat. No. 5,917,489 (hereinafter "the '489 patent"), by Thurlow et al., which issued on Jun. 29, 1999. In that system, a "rules wizard" is provided to an email user, thereby permitting the user to select various permutations of conditions, actions, and exceptions. Since the conditions, actions, and exceptions are described in detail in the '489 patent, further discussion of conditions, actions, and exceptions is omitted here.

While a "rules wizard" facilitates the organization of email messages, the functionality of the "rules wizard" is limited to the known subset of conditions, actions, exceptions, and various permutations thereof, which are defined for the particular email client. Additionally, the available set of rules is limited to processing email communications. Hence, those rules only provide organization mechanisms within the realm of email messages.

In view of the limitations of existing "rules wizards," a heretofore unaddressed need exists in the industry.

SUMMARY

The present disclosure provides for processing rules for digital messages.

Briefly described, some embodiments are directed to determining whether an email message meets a predefined condition, and executing an action in an instant messaging (IM) system in response to determining that the email message meets the predefined condition.

Other embodiments are directed to providing a programming interface, and storing inputs provided by a user at the programming interface. For those embodiments, the programming interface is adapted to receive user input in the form of a markup language. The inputs comprise a condition and an action.

Yet other embodiments are directed to determining whether a digital message meets a predefined condition, and executing a filtering algorithm on the digital message in response to determining that the digital message does not meet the predefined condition. The digital message may be, for example, an email message or an IM message Other systems, devices, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
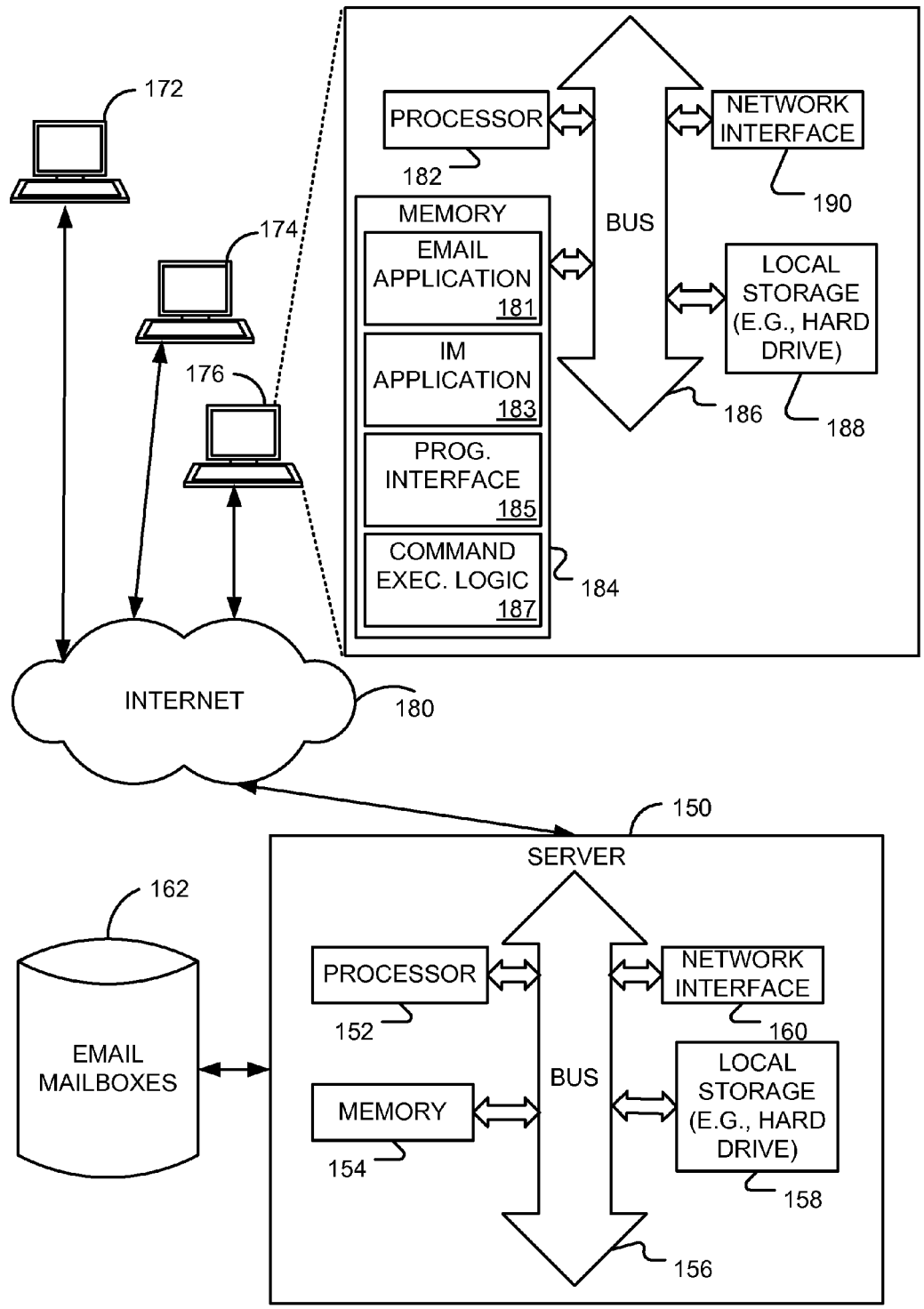
FIG. 1 is a block diagram showing an embodiment of a system for processing rules.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

In order to remedy some of the deficiencies of prior systems, various embodiments for processing rules are presented herein. In some embodiments, integration of email and instant messaging (IM) are shown in the context of processing rules for digital messages. For example, in some embodiments, actions are performed in IM when a condition is met in email. In a specific example, when an email message is received from a particular sender, the system may determine whether that sender is present on the Internet, and automatically launch an IM chat session with the sender if that sender is present.

In other embodiments, a programming interface is provided so that a user may customize specific conditions and actions, rather than merely selecting various permutations of predefined conditions and actions. In this regard, greater flexibility is provided to the user. In a specific example, the programming interface may be amenable to user input in the form of a markup language, such as Hypertext Markup Language (HTML) or Extensible Markup Language (XML). Thus, if a user is sufficiently adept at programming in these languages, that user may vastly expand the content of the rules for processing digital messages.

In other embodiments, a filtering algorithm is integrated with the rule engine, thereby providing an additional layer of functionality. For example, an email application may be configured to perform a Bayesian filtering of all incoming email messages in the absence of an indication to the contrary. In other words, the email application combines both a user-definable rules-based approach and a standard-algorithm-based approach to filtering digital messages. In this regard, filtering power is improved by combining the two separate approaches. Greater details of such systems and methods are provided below.

FIG. 1 is a block diagram showing an embodiment of a system for processing rules. As shown in FIG. 1, some embodiments of email systems comprise workstations 172, 174, 176 that are coupled to a server 150 over a network such as the Internet 180. The server 150 is coupled to a database 162 that stores the email accounts (or mailboxes) of various users.

In the operating environment shown in FIG. 1, a sender of an email message generates the email message at a sender workstation 172 and sends the email message through a network 180 (which may include a server 150 and a database 162) to a recipient at a recipient workstation 176. As shown in FIG. 1, the recipient workstation 176 includes a processor 182, a network interface 190, a memory 184, a local storage device 188, and a bus 186 that permits communication between the various components.

While not explicitly shown, it should be appreciated that the other workstations 172, 174 may also include similar components that facilitate computation or execution of applications on the workstations 172, 174. In some embodiments, the local storage device 188 may be a hard drive configured to electronically store data. The local storage device 188 may also store computer programs that execute on the recipient workstation 176. In this sense, the processor 182 is configured to access any program that is stored on the local storage device 188, and execute the program with the assistance of the memory 184.

In the embodiment of FIG. 1, an email application 181 is shown as being loaded into memory 184 for launching at the workstation 176, thereby permitting the workstation 176 to send and receive email messages through the network 180. Additionally, the memory 184 is shown as having an instant messaging (IM) application 183, which permits users at the workstation 176 to send and receive IM messages over the network 180. Moreover, a programming interface 185 and command execution logic 187 are shown as being loaded into memory 184. As described in greater detail below, the programming interface 185 and the command execution logic 187 are configured to provide the relevant functionality for extending conventional rule engines. Since the several embodiments below are described in conjunction with email and IM, it should be appreciated that both the programming interface 185 and the command execution logic 187 may be coupled to the email application 181 and the IM application 183. In this regard, both the email application 181 and the IM application may separately access the programming interface 185 and the command execution logic 187 in order to establish processing rules for incoming and/or outgoing digital messages.

Since the functioning of computing devices is well known in the art, further discussion of the processor 182, the memory 184, and the local storage device 188 are omitted here. However, it should be appreciated that the memory 184 may be either volatile or non-volatile memory.

The network interface 190 is configured to provide an interface between the recipient workstation 176 and the network. Thus, the network interface 190 provides the interface for the workstation 176 to receive any data that may be entering from the network and, also, to transmit any data from the workstation 176 to the network. Specifically, in some embodiments, the network interface 190 is configured to permit communication between each of the workstations 172, 174, 176 and the server 150 and, additionally, to permit communication among the workstations 172, 174, 176 themselves. In this regard, the network interface 190 may be a modem, a network card, or any other interface that interfaces each of the workstations 172, 174, 176 to the network. Since various network interfaces are known in the art, further discussion of these components is omitted here. It should be understood that various aspects of the email application 181 may be conventional or may be custom tailored to specific needs.

Similar to the workstation 176, the server 150 may also include a processor 152, a memory 154, a network interface 160, and a local hard drive 158, which are in communication with each other over a local bus 156. Since the components 152, 154, 156, 158, 160 at the server 150 perform largely similar functions as the components 182, 184, 186, 188, 190 at the workstation 176, further discussion of the server-side components is omitted here.

An example of a conventional rule engine is described in U.S. Pat. No. 6,057,841 (hereinafter "the '841 patent"), issued to Thurlow et al. and assigned to Microsoft® Corporation. The '841 patent is incorporated herein by reference as if set forth in its entirety. Unlike the '841 patent, the embodiments below provide integration between email and IM. Since systems and methods for integrating email and IM are described in greater detail in U.S. patent application Ser. No. 10/325,268 and U.S. patent application Ser. No. 10/274,408, only a truncated discussion of the integration of IM and email is provided here. By integrating IM and email as taught in U.S. patent application Ser. No. 10/325,268 and U.S. patent application Ser. No. 10/274,408, the universe of rules in the '841 patent may be extended from the closed set of rules, which only relate to email, to a vaster set of rules, which encompasses both email and IM. Example embodiments of rules that encompass both email and IM are shown with reference to FIGS. 5 and 6.

Another distinction is that, unlike the '841 patent, various embodiments of the present disclosure integrate a filtering algorithm in conjunction with a rules-based approach. Thus, while the '841 patent operates in a closed set of predefined rules, some embodiments of the present disclosure supplement the set of rules with additional filtering processes, such as, for example, Bayesian filters. In this regard, a more powerful filtering engine is provided to the email user. Since additional filtering algorithms, such as Bayesian filters, are described in greater detail in Ser. No. 10/610,736, filed on Jun. 30, 2003, Ser. No. 10/685,656, titled "Identifying Undesired Email Messages Having Attachments," and Ser. No. 10/685,558, titled "Phonetic Filtering of Undesired Email Messages," further discussion of additional filtering algorithms is omitted here. Example embodiments having combined rules and filtering algorithms are provided with reference to FIGS. 3 and 4.

Yet another distinction between the '841 patent and the various embodiments described herein is that, unlike the '841 patent, the embodiments of the inventive email and IM applications provide a programming interface 185 that permits expansion of the set of rules. In other words, the '841 patent only provides a limited set of conditions, actions, and exceptions from which the user may select various permutations. To the contrary, the programming interface 185, described in greater detail below, provides a user interface in which conditions, actions, and exceptions may be customized or programmed directly by the user. In this regard, the user may exponentially extend the set of rules to accommodate almost every need. Example embodiments that provide programming interfaces are shown with reference to FIG. 2.

Also, unlike the '841 patent, which stores all of the condition, actions, and exceptions in a proprietary language and links these with the mail application programming interface (MAPI) and operating system, various embodiments of this disclosure store the conditions, actions, and exceptions using a markup language, such as, for example, Hypertext Markup Language (HTML) or Extensible Markup Language (XML). In this regard, rules in some of the embodiments of this disclosure are portable to other operating systems and environments. An example XML-based rule engine may be configured to perform one or more actions when an email message is received, and the email message matches one or more conditions defined by the rule. In some embodiments, the rule engine may be developed using Microsoft Visual C++7.0 and the Active Template Library (ATL) version 7.0, in accordance with known methods. Since one example of an acceptable mechanism for discerning whether an email message matches a condition is described in great detail in the '841 patent, further discussion of that mechanism is omitted here.

In some embodiments, the data required to define a rule may include a rule identifier (ID), a rule type, a condition (also referred to herein as a "rule criterion" or, simply, "criterion"), and an action (also referred to herein as "rule action").

The rule ID uniquely identifies each rule. In this regard, a new rule ID is assigned to each newly-created rule. Preferably, the rule ID is assigned by the system and, upon assignment, maintained and tracked by the system using, for example, a database or a lookup table. In a preferred embodiment, the rule ID is a text representation of a 6-digit number used to identify a rule.

The rule type identifies the origin of the rule, and is designed to determine the source and/or purpose of the rule. In some embodiments, the rule type may include system rules, personal rules, SPAM rules, and parental control rules (also referred to as "child" rules).

The system rules are preferably rules that may be defined by the vendor of a particular email application or a particular IM application. In this regard, the system rules may be rules that are pre-packaged with the particular email or IM software.

The personal rules may be user-defined rules, which may be defined with the assistance of the particular email or IM application. In this regard, some personal rules may be defined using a "rules wizard" somewhat similar to that described in the '841 patent. Other personal rules may be defined using the programming interface 185, which permits customized code writing by the user.

The SPAM rules relate to filtering algorithms that may be used in conjunction with system rules or personal rules. Thus, the SPAM rules may be invoked in response to a particular condition being met.

The child rules relate to parental control functionality. In this regard, the child rules may be accessible by users having predefined access levels. For example, if both a parent and a child share the same computer and email application, then the child rules may be invoked or disabled only by the parent. In this regard, the parent may prevent the child from disabling certain rules.

The rule criterion (or condition) is used to determine whether or not to apply a particular rule. In some embodiments, the rule criterion may include two parts: (1) rule criterion type; and (2) rule criterion data. In other words, if the rule criterion is implemented in XML, then the rule criterion may have an XML tag as the criterion type and an argument associated with the XML tag as the rule criterion data. The following CHART 1 provides, among others, example rule criterion types, their corresponding rule criterion data, and the description of the criterion data. The rule criterion types are identified by their corresponding XML tags.

CHART 1

| Rule Criteria (Conditions) | | | |
| --- | --- | --- | --- |
| Criterion Type | TAG | Description | Criterion Data |
| From Address | FROMADDR | Message is from a specific internet address. | Internet address |
| From Domain | FROMDOMAIN | Message is from a given internet domain. | Internet Domain Name |
| To Address | TOADDR | Message was sent to a specific internet address | Internet Address |
| Cc Address | CCADDR | Message was Carbon Copied to a specific internet address | Internet Address |

CHART 1-continued

Rule Criteria (Conditions)

| Criterion Type | TAG | Description | Criterion Data |
|---|---|---|---|
| Subject Keyword | SUBJECTKEY | Message Subject contains a keyword or keyword list | Keyword or keyword list |
| Body Keyword | BODYKEY | Message Body contains a keyword or keyword list | Keyword or keyword list |
| Body XML TAG | BODYTAG | Message Body contains an XML or HTML TAG | Tag Name |
| Empty Message Subject | NOSUBJECT | The Message Subject was empty | Nothing |
| Empty Message Body | NOBODY | The Message Body was empty | Nothing |
| Message Size greater than | MSGSIZE | The Message Body size was greater than a given size | Size in bytes |
| All Messages | ALL | All Messages | Nothing |
| If Sender is Presently online on BIM. | SENDERPRESENT | Is the sender currently logged into BIM and present? | Nothing |
| Source IP Address | SOURCEIP | The Message sent from a given source IP address | IP Address |
| Source IP Range | SOURCEIPRANGE | The Message was sent from a range of IP Addresses | IP Address, IP Address |
| Bayesian Filter Test | BAYESIAN | The message will be tested against the Bayesian Probability Engine to determine if this message is considered SPAM. | Nothing |

The rule action is the action that will be performed if its corresponding condition is met. Similar to the rule criterion, the rule action may include two parts: (1) rule action type; and (2) rule action data. Thus, if the rule action is implemented in XML, then the rule action may have an XML tag as the action type and an argument associated with the XML tag as the rule action data. The following CHART 2 provides, among others, example rule action types, their corresponding rule action data, and the description of the action data. The rule action types are identified by their corresponding XML tags.

CHART 2

Rule Actions

| Action Type | TAG | Description | Action Data |
|---|---|---|---|
| Move to Folder | MOVE | Move the message to a given E-mail Folder | Folder Path |
| Copy to Folder | COPY | Insert a copy of the message in a given E-mail Folder | Folder Path |
| Delete Message | DELETE | Delete the Message | Nothing |
| Forward Message | FORWARD | Forward the message to a given internet address | Internet Address |
| Auto Reply | AUTOREPLY | Automatically Reply to the message with a static message | Path to Static Message in RFC822 format |
| Do not Download | NOTDOWNLOAD | Do not download the message from the server | Nothing |
| Delete the Message from the Server | DELETESVR | Delete the Message from the Server | Nothing |

CHART 2-continued

Rule Actions

| Action Type | TAG | Description | Action Data |
|---|---|---|---|
| Replace Message | REPLACE | Replace the Message with a Static Message and existing header | Path to Static Message in RFC822 format |
| Play Sound | PLAY | Play a Sound | Path to Sound File. |
| Popup an Alert | POPUP | Popup an Alert | Text to put in alert. |
| Open E-mail Read Dialog | OPENREAD | Open an E-mail read dialog with the current message loaded | Nothing |
| Open a chat window to sender | OPENCHAT | Open a Chat window to the Sender of the Message. | Nothing |
| Report to Abuse | ABUSE | Send the Header to BellSouth E-mail Abuse Center | Nothing |
| Report as Spam | SPAM | Forward the Message to "thisisspam@bellsouth.net" | Nothing |

In some embodiments, the rules may be stored on the local system in an XML-based text file. For the embodiments described above, the root node for the XML-based text file is a "RULE" tag (e.g., <RULE . . . >). In those embodiments, the RULE tag has value pairs for rule ID (e.g., ruleID="001001"), rule type (e.g., ruleType="System"), and order (e.g., order="1"). The order value pair determines the order in which to execute the rule.

The "CRITERIA" tag (e.g., "<CRITERIA>") and the "ACTION" tag (e.g., "<ACTION>"), which identify the condition and the action, respectively, may be located under the RULE tag. Optionally, an "EXCEPTION" tag may also exist under the RULE tag, thereby providing any exceptions to the rule. Similar to the CRITERIA tag and the ACTION tag, the EXCEPTION tag may be defined by value pairs. The CRITERIA tag describes the condition for which the rule will be executed. The ACTION tag describes the action that will be performed if the CRITERIA is met. The EXCEPTION tag describes the case when the rule will not be executed.

If multiple CRITERIA tags exist within a rule, then an "operator" value pair may be provided, in order to define whether the conditions should be met in the conjunctive ("and") or in the disjunctive ("or"). In other words, the operator value pair determines how to logically bind the conditions. In some embodiments, if an operator value pair is not supplied, then the default value may be the conjunctive "and" operation. In other embodiments, the default may be set to the "or" operation.

Thus, for example, a rule may appear as follows:

```
<RULE ruleID="001001" ruleType="System" order="1">
  <CRITERIA>
    <BODYKEY operator="OR" data="XXX"></BODYKEY>
    <SUBJECTKEY operator="OR" data="XXX"></SUBJECTKEY>
  </CRITERIA>
  <EXCEPTION>
    <FROMADDR data="foo@foo.com"></FROMADDR>
  </EXCEPTION>
  <ACTION>
```

-continued

```
    <DELETE></DELETE>
    <SPAM></SPAM>
</RULE>
```

In the example rule, the ruleID of 001001 uniquely identifies the rule. The example rule is a system rule, which, for example, is provided by the vendor. Additionally, this rule has an order of "1" (i.e., order="1"), which indicates that this rule should be processed prior to processing other rules.

In the example rule, the condition (i.e., <CRITERIA>) for performing an action is the text "XXX" (i.e., data="XXX") being found in either the text body (i.e., BODYKEY) of the digital message or (i.e., operator="OR") the text "XXX" being found in the subject line (i.e., SUBJECTKEY) of the digital message.

The rule should not be executed if the digital message is received from foo@foo.com (i.e., FROMADDR data="foo@foo.com"). Thus, if either of those conditions are met, and the digital message is not from foo@foo.com, then, for the example rule, the corresponding action results in deletion of the email message (i.e., <DELETE></DELETE>) and reporting of the email as SPAM (i.e., <SPAM></SPAM>).

Having described several embodiments of rule syntax and storage, FIGS. 2 through 6 provide several embodiments of methods for processing rules for digital messages.

Figure 2:
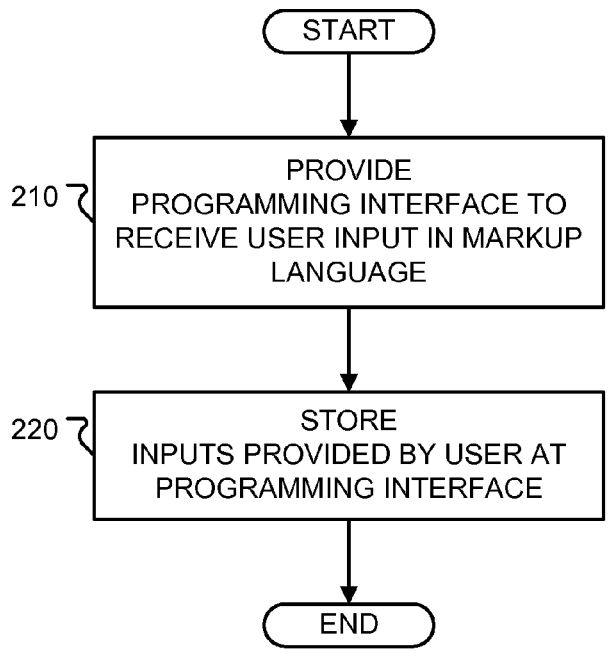
FIG. 2 is a flowchart showing an embodiment of a method for processing rules.

FIG. 2 is a flowchart showing an embodiment of a method for processing rules. As shown in FIG. 1, an embodiment of the process may be seen as comprising the steps of providing (210) a programming interface 185, which permits entry of a condition and a corresponding action by a user. The embodiment of the method further includes the step of storing (220) the condition and action provided by the user at the programming interface 185. In a preferred embodiment, the programming interface 185 may be a text editor at which the user may provide XML-tagged conditions, actions, and exceptions. In this regard, the text editor provides an interface at which the user may input the various conditions such as those provided in CHART 1 and the various actions such as those provided in CHART 2.

Figure 7:
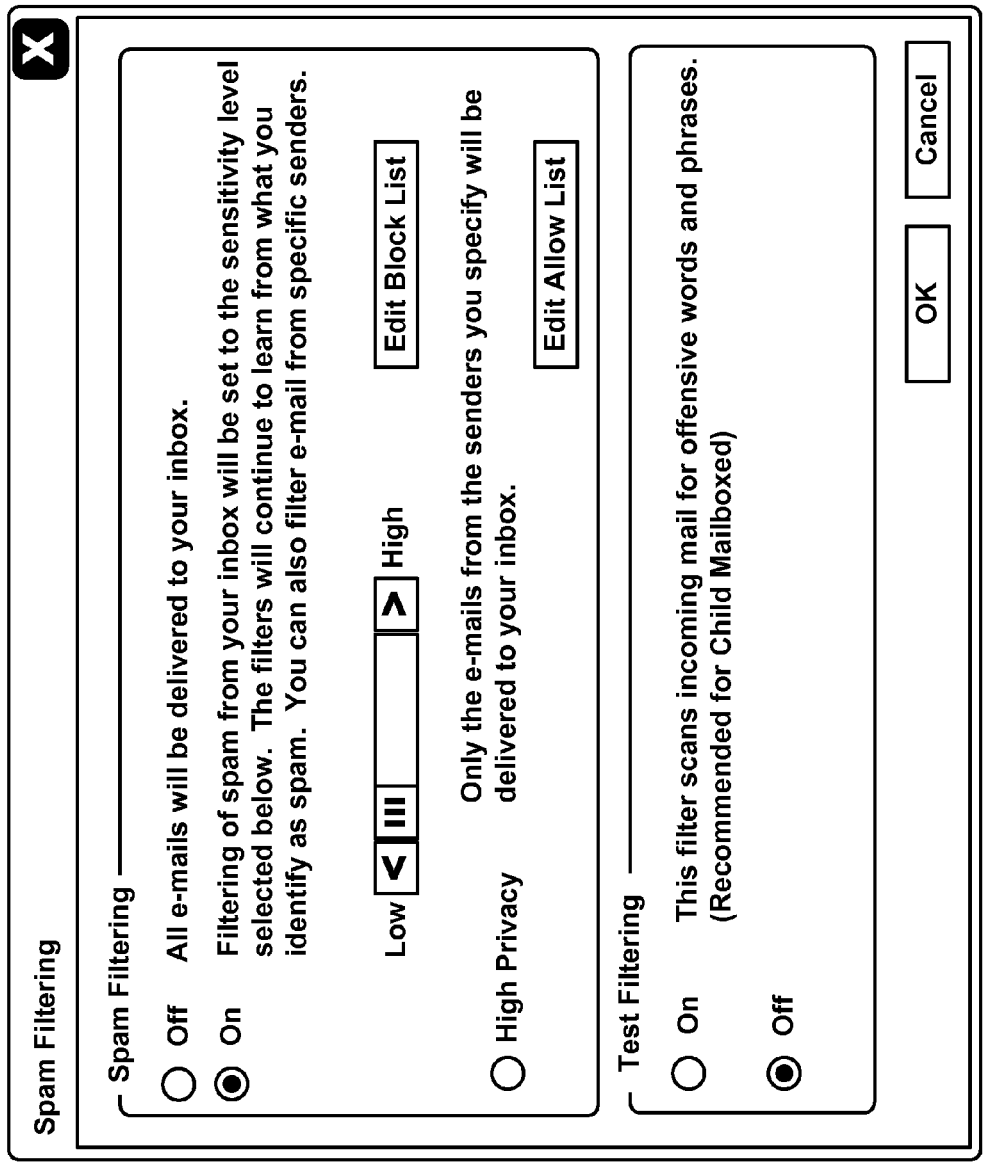
FIG. 7 is a diagram showing an example graphical user interface (GUI) for an embodiment of a system for processing rules.

In another embodiment, the user interface may be one or more graphical user interfaces that query the user for input. In some embodiments, multiple user interfaces are sequentially presented to the user, with each user interface querying the user for a specific piece of information. For example, as shown in FIG. 7, the user interface may be a SPAM filter. The user interface provides user-selectable options to activate or deactivate the function. In the example of FIG. 7, options are provided to either turn "on" or turn "off" the SPAM filtering functions. When the user selects one of the options by, for example, clicking on the selection using a mouse or other pointing device, the underlying software performs the corresponding function by selectively activating or deactivating the filtering function. In some embodiments, in which the rule engine is implemented using XML, the activation or deactivation of the filtering function may be performed by toggling an XML-based value pair (e.g., a tag and its corresponding argument) that corresponds to the filtering function.

In some embodiments, when the filter is turned "on," additional options for filter settings are provided. For example, options may be provided to create or edit a "block list" or an "allow list." The block list includes email addresses of specific senders from whom the user chooses not to receive any email messages. The allow list includes email addresses of specific senders from whom the user will always receive email messages. Since various example implementations of both the block list and the allow list would be understood by those skilled in the art after reading the present disclosure, including documents incorporated herein by reference, further discussion of the block list and the allow list is omitted here.

In addition to the block list and the allow list, the sensitivity of the filter may be adjusted. In some embodiments, the filter is implemented as a Bayesian filter, which is known by those having ordinary skill in the art, as evidenced by publications such as, for example, "A Plan for Spam" by Paul Graham, published in August of 2002 (also referred to herein as "the Graham article"), which is incorporated herein by reference in its entirety. As known to those skilled in the art, the sensitivity of the Bayesian filters (or other similar filters) may be varied by assigning various weights to the filtering functions. Since the underlying mechanism for varying of the sensitivity of filters is known in the art, further discussion of the underlying mechanism is omitted here. However, unlike conventional approaches, several embodiments of the present disclosure provide a user-friendly approach to varying the sensitivity of the filter. For example, in conventional approaches, the various weights are directly adjusted by the user, who inputs specific numeric values as weights to the functions.

In contrast to the conventional approaches, the embodiments of the present disclosure provide a user-friendly interactive interface in which a user is queried in plain English for various settings. For example, rather than providing specific numeric weights, the user is queried for whether the filter should have a "high" sensitivity or a "low" sensitivity. This query may be in the form of a "sliding scale" on a graphical user interface, similar to that shown in FIG. 7. Upon input by the user, the input is converted to a specific numeric value for the user, thereby alleviating the user from performing rigid calculations. In other words, rather than having the user calculate the various weights to the filtering functions, the several embodiments of the disclosure perform the calculation of the weights by correlating the user's input to varying weights. For example, if the user's input reflects a "high" degree of sensitivity, then the underlying filtering mechanism may, among others, assign a higher numeric value (e.g., 90%) to the weight of the filtering function for undesired words (or vice versa), include additional tokens in the filtering process, assign a lower numeric value (e.g., 10%) to the weight of the filtering function for desired words (or vice versa), etc. Conversely, if the user's input reflects a "low" degree of sensitivity, then the underlying filtering mechanism may, among others, assign a more neutral numeric value (e.g., 65%) to the weight of the filtering function for undesired words (or vice versa), include fewer tokens in the filtering process, etc. Greater convenience to the user is achieved by providing a user-friendly interface in which the user is alleviated from directly performing complex calculations.

While a filtering rule has been described in great detail above, it should be appreciated that other rules may be established in a similar manner. For example, user-friendly, plain-English, interactive interfaces may be provided to the user for establishing rules that save messages into various folders. Similarly, for other embodiments, user-friendly interactive interfaces may be provided for establishing rules that launch instant messaging (IM) chat sessions with email senders. These, and various other functions, are shown with reference to FIGS. 3 through 6.

For rules that are written in XML and stored in an XML database, it should be appreciated that the rules, once established and stored, may be accessed by a user through, for example, a text editor. Alternatively, the rules may, in other embodiments, be accessed by a user through a menu-driven mechanism. Since text editors and menu-driven mechanisms are known in the art, further discussion of such mechanisms and editors is omitted here. Once accessed, the user may selectively edit, delete, rename, etc. the rules as desired.

Figure 3:
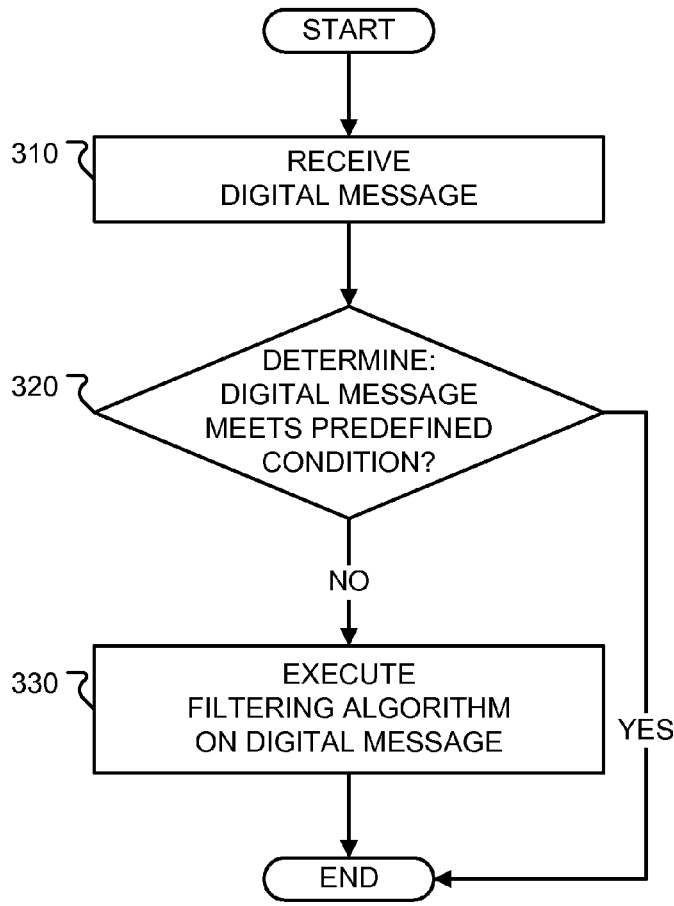
FIG. 3 is a flowchart showing another embodiment of a method for processing rules.

FIG. 3 is a flowchart showing another embodiment of a method for processing rules. The embodiment of FIG. 3 shows a process that begins after one or more rules have been created and stored. In this regard, the process of FIG. 3 presumes that predefined rules already exist in the system. These predefined rules may be various permutations of conditions and actions, as shown in CHART 1 and CHART 2. Thus, the embodiment of FIG. 3 begins when a digital message, such as an email message, is received (310). Upon receiving (310) the digital message, the system determines (320) whether or not the digital message meets the predefined condition. If the digital message meets the predefined condition, then the process ends. If, on the other hand, the digital message does not meet the predefined condition, then a filtering algorithm is executed (330) on the digital message. Thus, FIG. 3 provides an example in which a filtering algorithm is executed (330) unless there is some indication to prevent execution of the filtering algorithm. For example, if an email application receives an email message from foo@foo.com, and email from that sender is always welcome, then that email message will be received without further filtering.

Figure 4:
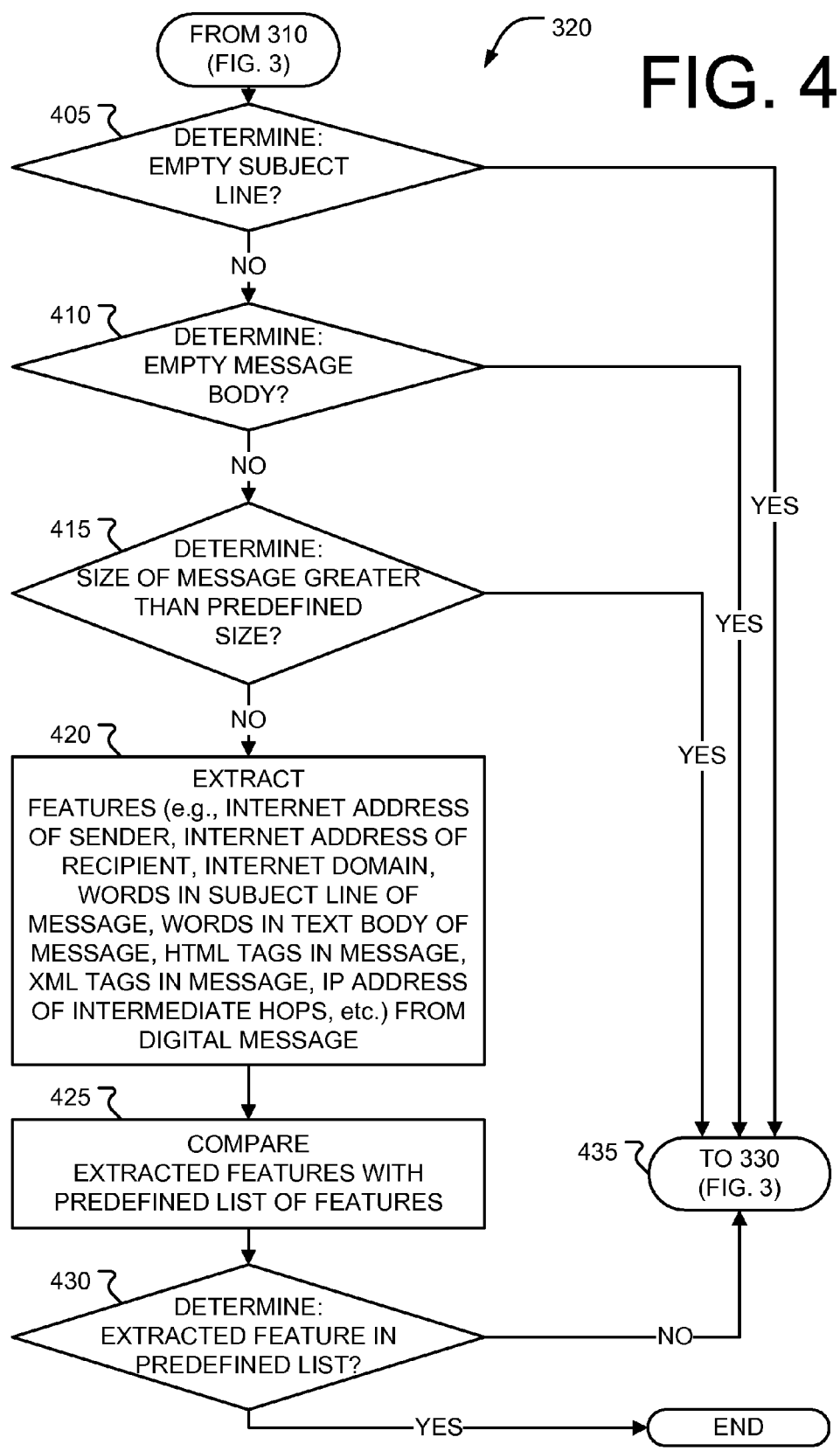
FIG. 4 is a flowchart showing, in greater detail, the step of determining whether or not a digital message meets a predefined condition, which is shown in FIG. 3.

FIG. 4 is a flowchart showing, in greater detail, the step of determining (320) whether or not a digital message meets a predefined condition, as shown in FIG. 3. Specifically, the embodiment of FIG. 4 provides an example of determining (320) whether or not a received email message should bypass a filter, such as, for example, a Bayesian filter.

As shown in the embodiment of FIG. 4, the determining (320) step may begin by first determining (405) whether or not an email message has an empty subject line. If the email message has an empty subject line, then the process exits to FIG. 3, and a filtering algorithm is executed (330) on the email message. If, on the other hand, the subject line is not empty, then the process continues by next determining (410) whether or not the message body is empty. If the message body is empty, then the process exits to FIG. 3, and the filtering algorithm is executed (330) on the email message. Conversely, if the message body is not empty, then the process next determines (415) whether or not the size of the message is greater than a predefined size. In some embodiments, the threshold for email size may be two or three megabytes. It should, however, be appreciated that this threshold may be varied according to the various needs of the user. If the message size exceeds the predefined threshold, then the process exits to FIG. 3, and the filtering algorithm is executed (330) on the email message. If, however, the threshold message size is not exceeded, then the process continues by extracting (420) various features from the email message. The various features may include the Internet address of the sender, the Internet address of the recipient, Internet domain names, words in the subject line of the message, words in the body of the message, HTML or XML tags in the email message, IP addresses of intermediate Internet hops, or a variety of other features. Since these features are discussed in greater detail in Ser. No. 10/610,736, filed on Jun. 30, 2003, Ser. No. 10/685,656, titled "Identifying Undesired Email Messages Having Attachments," filed on Oct. 14, 2003, and Ser. No. 10/685,558, titled "Phonetic Filtering of Undesired Email Messages," filed on Oct. 14, 2003, further discussion of these features is omitted here. Upon extracting (420) the various features, the features are compared (425) with a predefined list of features, and the system determines (430) whether or not the extracted feature exists in the predefined list. If the feature does not exist in the predefined list, then the process exits to FIG. 3, and the filtering algorithm is executed (330) on the email message. Alternatively, if the extracted feature exists in the predefined list, then the process ends without additionally filtering the email message.

For example, if the user does not wish to additionally filter an email message from foo@foo.com, then foo@foo.com will be an entry in the predefined list. Thus, if the extracted Internet address of the sender is foo@foo.com, then the additional filtering algorithm is not executed on that email message.

Figure 5:
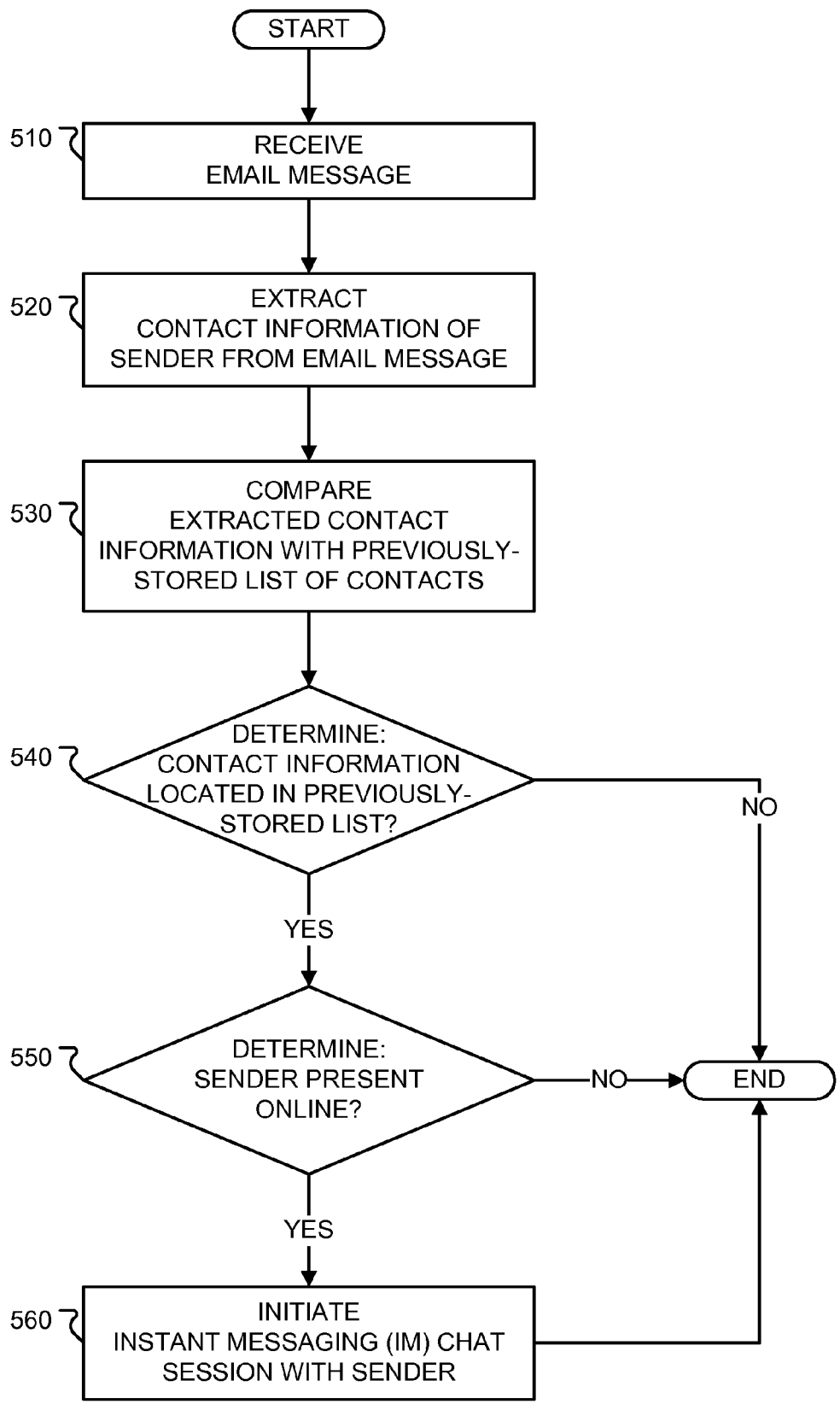
FIG. 5 is a flowchart showing yet another embodiment of a method for processing rules.

FIG. 5 is a flowchart showing yet another embodiment of a method for processing rules. The embodiment of FIG. 5 shows a process that begins after one or more rules have been created and stored. In this regard, the process of FIG. 5 presumes that predefined rules already exist in the system. These predefined rules may be various permutations of conditions and actions, as shown in CHART 1 and CHART 2. Thus, the embodiment of FIG. 5 begins when a digital message, such as an email message, is received (510) from a sender. Upon receiving the email message, contact information of the sender is extracted (520) from the email message. The contact information may be the email address of the sender, the name of the sender, or other information indicative of the sender. The extracted (520) contact information is compared (530) with a previously-stored list of contacts, and the system determines (540) whether or not the contact information is stored in that list. If the contact information is not stored in that list, then the process ends. If, however, the contact information exists in the list, then the system further determines (550) whether or not the sender is present online (e.g., present and available). Since the determination of the sender's presence from the sender's email contact information is described in greater detail in U.S. patent application Ser. No. 10/325,268 and U.S. patent application Ser. No. 10/274,408, further discussion of determining (550) the sender's presence is omitted here. If the system determines (550) that the sender is not present online, then the process ends. Conversely, if the system determines that the sender is present online, then an IM chat session is initiated (560) between the recipient and the sender.

Figure 6:
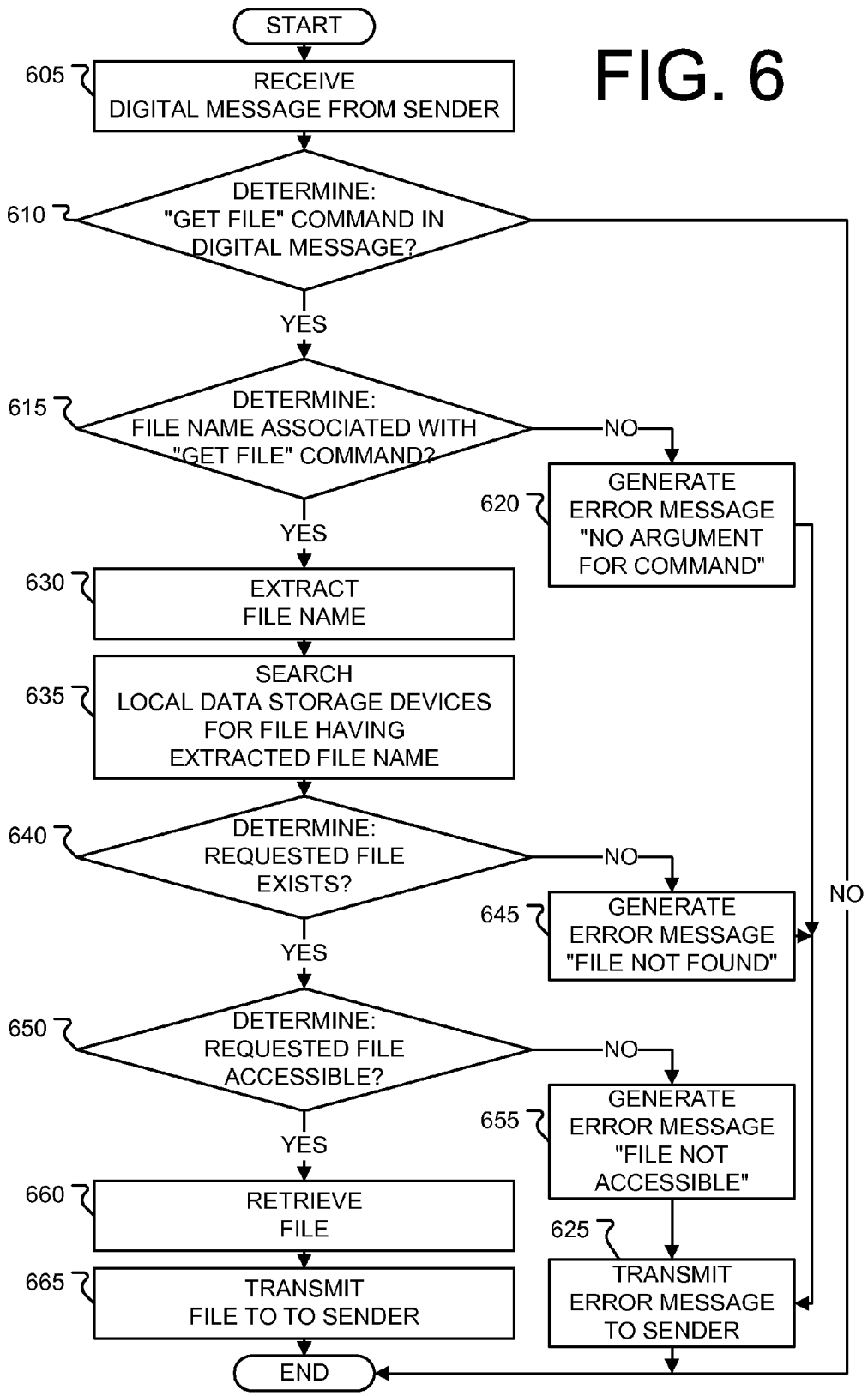
FIG. 6 is a flowchart showing a specific embodiment of another rules-processing method.

FIG. 6 is a flowchart showing a specific embodiment of another rules-processing method. The embodiment of FIG. 6 shows a process that begins after one or more rules have been created and stored. In this regard, the process of FIG. 6 presumes that predefined rules already exist in the system. These predefined rules may be various permutations of conditions and actions, as shown in CHART 1 and CHART 2. Thus, the embodiment of FIG. 6 begins when a digital message, such as an email message, is received (605) from a sender. Upon receiving (605) the digital message, the system determines (610) whether or not the digital message contains a command. The command may be a text string in the message, such as, for example, "get file." If the digital message does not contain a command, then the process ends. If, however, the digital message does contain a command, then the system further determines (615) whether or not the command is associated with an argument (e.g., file name). For example, the message may contain a text string such as "get file=foo.doc." If the command (e.g., "get file") is not associated with an argument (e.g., file name, "foo.doc"), then an error message is generated (620), which indicates that there is no argument for the command. The generated (620) error message is transmitted (625) to the sender of the digital message, after which the process is terminated. If, in this example, the command is associated with a file name, then the file name is extracted (630). Using the extracted (630) file name, the local data storage devices (e.g., hard drives) are searched (635), and the system determines (640) whether or not such a file exists on the local hard drives. If the file does not exist locally, then an error message is generated (645), which indicates that the file could not be found. The error message is transmitted (625) to the sender of the digital message, and the process is terminated. If the requested file is found locally, then the system further determines (650) whether or not access to the file has been restricted. If access to the file has been restricted by, for example, defining the file property as "hidden" or "private," then an error message is generated (655), which indicates that the file is not accessible. That error message is transmitted (625) to the sender of the digital message, and the process is thereafter terminated. If the requested file is accessible, then the file is retrieved (660) and transmitted (665) to the sender of the digital message. In this regard, as shown in the embodiment of FIG. 6, the rule processing method may be customized to carry out a variety of functions previously unavailable in conventional email and IM applications.

As shown in the various embodiments above, by providing a versatile rule engine, the functionality for both email and IM applications is increased.

The email application 181, the IM application 183, the programming interface 185, and the command execution logic 187 may be implemented in hardware, software, firmware, or a combination thereof. In the preferred embodiment(s), the email application 181, the IM application 183, the programming interface 185, and the command execution logic 187 are each implemented in software or firmware that is stored in a memory and that is executed by a suitable instruction execution system. If implemented in hardware, as in an alternative embodiment, the email application 181, the IM application 183, the programming interface 185, and the command execution logic 187 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In this regard, it should be appreciated that the IM application 183 may include presence-determination logic, IM-chat-initiation logic, and other structures that are specifically configured to carry out relevant IM functions. Similarly, it should be appreciated that the email application 181 may include condition-determination logic, information-extraction logic, and other structures that are specifically configured to carry out relevant email functions. Likewise, it should be appreciated that the programming interface 185 may include program-interface logic, which provides the structural components that are configured to render a user interface to receive user input, and other relevant structures that are specifically configured to carry out the various functions of the programming interface 185.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The email application 181, the IM application 183, the programming interface 185, and the command execution logic 187 may be computer programs, which comprise ordered listings of executable instructions for implementing logical functions. As such, these programs may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A method for handling digital messages, the method comprising:
    providing a programming interface, the programming interface adapted to receive user input, the user input being provided in a markup language, wherein the programming interface comprises a text editor allowing a user to freely type a rule for handling digital messages in which conditions, actions, and exceptions may be programmed directly by the user by typing the rule with the text editor, wherein the rule typed by the user is not previously defined and not previously available to be selected within the programming interface;
    storing inputs provided by the user at the programming interface, the inputs being provided in the markup language, the inputs comprising a condition, the inputs further comprising an action, wherein the inputs comprise rules for handling digital messages including a rule for answering a request for a file;
    receiving a digital message from a message sender in a first messaging protocol;
    determining whether the digital message includes a request for a file in accordance with the rule for answering a request for a file;
    in response to determining that the digital message includes the request for the file, determining whether a file name is associated with the request for the file in accordance with the rule for answering a request for a file; and
    in response to determining that a file name is associated with the request for the file:
    extracting a file name;
    searching at least one local storage device for a file having the extracted file name;
    in response to locating the file, determining whether the file is accessible;
    in response to determining that the file is accessible, retrieving the requested file;
    in response to retrieving the file, transmitting the requested file to the message sender in a second messaging protocol when the sender is determined to be actively present on a communications network utilizing the second messaging protocol; and
    transmitting the file in the first messaging protocol to the message sender in response to retrieving the file when the message sender is determined to not be actively present on the communications network utilizing the second messaging protocol,
    wherein the rules authored using the programming interface are applied to both incoming messages in the first messaging protocol and incoming messages in the second messaging protocol.

2. The method of claim 1, wherein the first messaging protocol comprises an email protocol.

3. The method of claim 1, wherein the second messaging protocol comprises an instant messaging protocol.

4. The method of claim 3, further comprising:
    retrieving an instant messaging address for the message sender from a list of contacts that contains an email messaging address for the message sender.

5. A non-transitory computer-readable medium that stores a program that, when executed by a computer, causes the computer to perform at least the following:
    provide a programming interface, the programming interface adapted to receive user input, the user input being provided in a markup language, wherein the programming interface comprises a text editor allowing a user to freely type a rule for handling digital messages in which conditions, actions, and exceptions may be programmed directly by the user by typing the rule with the text editor, wherein the rule typed by the user is not previously defined and not previously available to be selected within the programming interface;

store a rule for handling digital messages, the rule comprising a condition in the markup language and an action in a markup language;

receive a digital message from a message sender in a first messaging protocol;

determine whether the digital message meets the condition in accordance with the rule for answering a request for a file; and in response to determining that the digital message includes the request for the file, determine whether a file name is associated with the request for the file in accordance with the rule; and in response to determining that a file name is associated with the request for the file:
  extract a file name;
  search at least one local storage device for a file having the extracted file name;
  in response to locating the file, determine whether the file is accessible;
  in response to determining that the file is accessible, retrieve the requested file;
  in response to retrieving the file, transmit the requested file to the message sender in a second messaging protocol when the message sender is determined to be actively present on a communications network utilizing the second messaging protocol; and transmit the file in the first messaging protocol to the message sender in response to retrieving the file when the message sender is determined to not be actively present on the communications network utilizing the second messaging protocol, wherein the rules authored using the programming interface are applied to both incoming messages in the first messaging protocol and incoming messages in the second messaging protocol.

6. The non-transitory computer-readable medium of claim 5 wherein the first messaging protocol comprises an email protocol.

7. The non-transitory computer-readable medium of claim 5 wherein the second messaging protocol comprises an instant messaging protocol.

8. The non-transitory computer-readable medium of claim 7, the program further causing the computer to perform:
  retrieve an instant messaging address for the message sender from a list of contacts that contains an email messaging address for the message sender.

9. A system for handling digital messages, the system comprising:
  a memory component that stores at least the following:
    program-interface logic configured to provide a programming interface, the programming interface adapted to receive user input, the user input being provided in a markup language, wherein the programming interface comprises a text editor allowing a user to freely type a rule for handling digital messages in which conditions, actions, and exceptions may be programmed directly by the user by typing the rule with the text editor, wherein the rule typed by the user is not previously defined and not previously available to be selected within the programming interface;
    input-storage logic configured to store inputs provided by the user at the programming interface, the inputs being provided in the markup language, the inputs comprising a condition, the inputs further comprising an action, wherein the inputs comprise rules for handling digital messages including a rule for answering a request for a file;
    receiving logic configured to receive a digital message from a message sender in a first messaging protocol;
    determining logic configured to determine whether the digital message includes a request for a file in accordance with the rule for answering a request for a file;
    determining logic configured to, in response to determining that the digital message includes the request for the file, determining whether a file name is associated with the request for the file in accordance with the rule for answering a request for a file; and
    logic configured to, in response to determining that a file name is associated with the request for the file:
      extract a file name;
      search at least one local storage device for a file having the extracted file name;
      determine whether the requested file is accessible;
      in response to determining that the requested file is accessible, retrieve the requested file;
      in response to retrieving the file, transmit the requested file to the message sender in a second messaging protocol when the message sender is determined to be actively present on a communications network utilizing the second messaging protocol; and
      transmit the file in the first messaging protocol to the message sender in response to retrieving the file when the message sender is determined to not be actively present on the communications network utilizing the second messaging protocol,
    wherein the rules authored using the programming interface are applied to both incoming messages in the first messaging protocol and incoming messages in the second messaging protocol.

10. The system of claim 9, wherein the first messaging protocol comprises an email protocol.

11. The system of claim 9, wherein the second messaging protocol comprises an instant messaging protocol.

12. The system of claim 11, further comprising:
  logic configured to retrieve an instant messaging address for the message sender from a list of contacts that contains an email messaging address for the message sender.

* * * * *